Dec. 22, 1970    L. F. SIBLEY    3,549,197
COVER FOR TRUCKS
Filed Jan. 10, 1966

INVENTOR
LOUIS F. SIBLEY

BY *Chas. R. Day*

ATTORNEY

United States Patent Office 3,549,197
Patented Dec. 22, 1970

3,549,197
COVER FOR TRUCKS
Louis F. Sibley, Hardwick, Mass., assignor, by mesne assignments, to Pioneer Coveralls, Inc., Ware, Mass., a corporation of Massachusetts
Filed Jan. 10, 1966, Ser. No. 519,482
Int. Cl. B60p 7/02
U.S. Cl. 296—100
3 Claims

ABSTRACT OF THE DISCLOSURE

A cover for an open top vehicle body which includes a cover rolled upon a shaft, the shaft being mounted on the cab or headboard of the vehicle and including means mounted on the vehicle body sides to extend said cover over the contents of the body by unrolling the same from the roll assembly to the rear end of the vehicle body, the cover unrolling means comprising a bail assembly operated as for instance by power means including a spring, and including crank means for returning the bail and the cover to vehicle-body uncovered position.

---

This invention relates to a new and improved cover for truck bodies, and more particularly for open box-type bodies for transporting discrete material which is apt to fall from the truck onto the highway.

The principal object of the invention resides in the provision of a simplified construction of the class described which is easy to operate and includes spring-loaded means for spreading a flexible cover such as a tarpaulin, canvas or the like over the body contents simply upon the removal of means holding the cover in inoperative condition just behind the headboard; and the provision of a bail including a pair of legs each of which is swivelly mounted with respect to a side of the truck body and including springs for moving the same to body-covered position, the bail having a closed end portion connected to a flexible cover in the nature of canvas or the like which may be rolled on an arbor at the headboard of the cab of the truck and which upon being released is urged by the springs to a truck body-covered position substantially automatically, and particularly in combination with a spring-loaded hold-down assembly which can be turned down from an inoperative position on the headboard to a position more or less in the truck body to hold the cover down adjacent the cab of the truck to the end that the contents of the truck are fully covered from end to end thereof without gaps.

Other objects and advantages of the invention will appear hereinafter.

Reference is to be had to the accompanying drawings in which.

Figure 1:
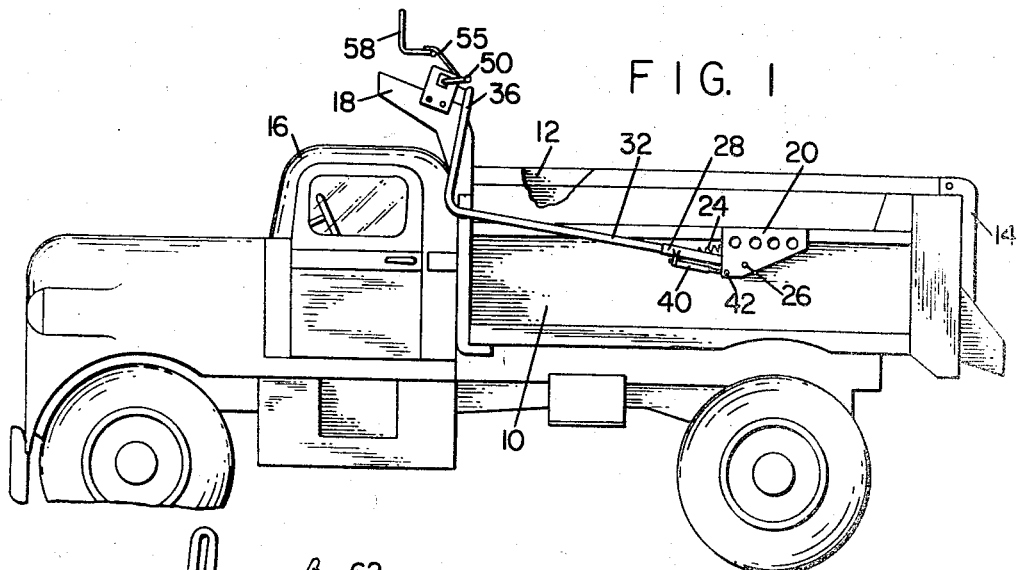
FIG. 1 is a view in side elevation illustrating a truck with the new cover apparatus applied thereto and showing the same in inoperative position.

The invention to be described herein may be mounted on any kind of vehicle or truck body. In FIG. 1 there is represented an open truck body which has the two sides 10 and 12, the rear end member 14 which is usually openable, a cab at 16 and a headboard for the body at 18.

Figure 2:
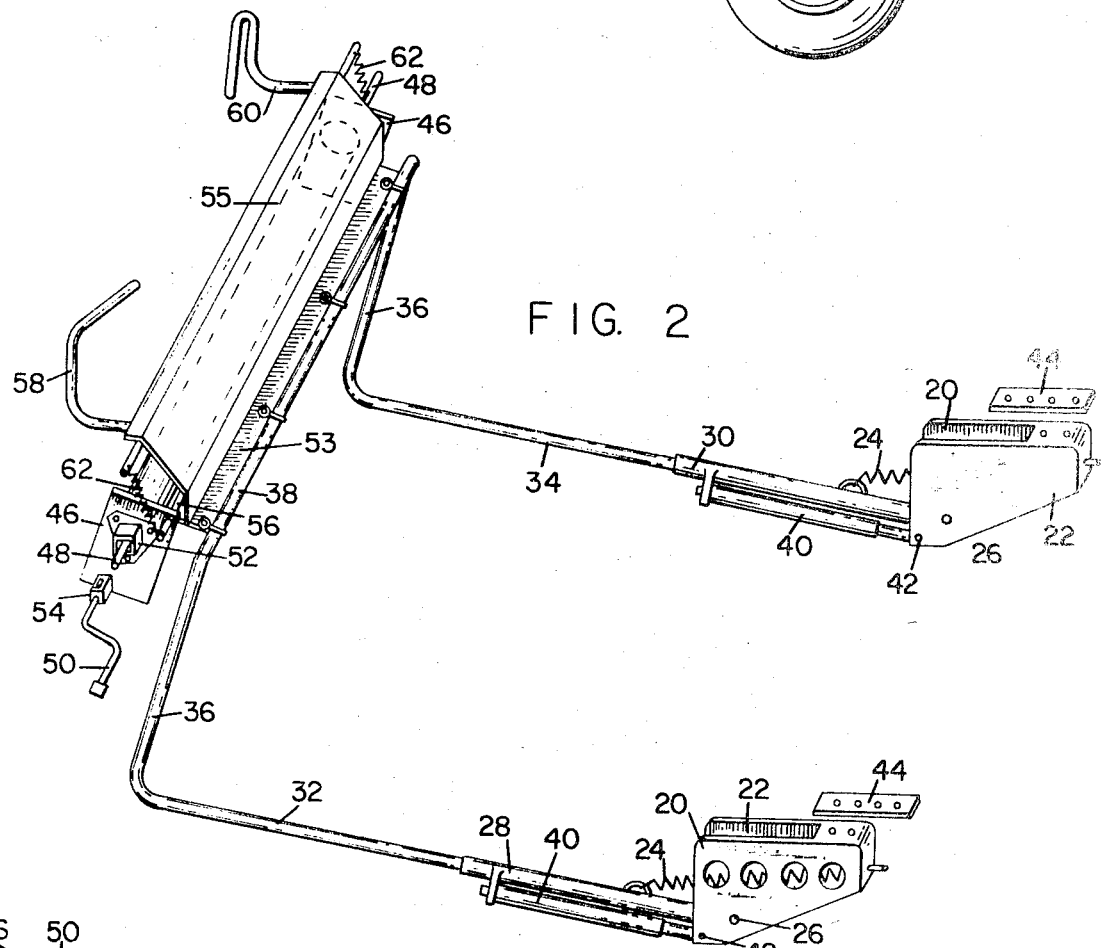
FIG. 2 is a perspective view showing the apparatus in inoperative position.

A pair of brackets are mounted one on each side as best seen in FIG. 2, each bracket comprising as a practical embodiment a pair of plates 20 and 22. These brackets are reversed with respect to each other, the plates 22 being mounted in any way desired on the sides of the truck and the plates 20 being held in spaced relation with respect to the corresponding plates 20 by any means such as spacers of any kind. Each of these brackets comprises a housing for a spring 24 which may be provided with an adjustable tension in a known manner if this should be desired. Between the plates of each bracket approximately at the position indicated by the reference characters 26, there are pins or the like upon each of which there is swingably mounted a leg as at 28 and 30. The legs 28 and 30 are provided with telescoping members at 32 and 34 which may in turn be provided with appropriate locks or the like so that these legs can be extended according to the length of the truck body.

The legs at 32 and 34 terminate in upwardly bent portions 36, 36 joined by a cross member 38 completing the bail construction.

Each of the legs is preferably provided with a dashpot or hydraulic shock-absorber of well-known type generally indicated at 40, 40. Here again the effect of these shock-absorbers can be adjusted in a known manner, these shock-absorbers being commercial embodiments of well-known devices. They take up the shock in the motion of the bail and prevent it from snapping over as will become more apparent hereinafter. It is to be understood that the entire bail swings from its inoperative position in FIGS. 1 and 2 to the fully operative position in FIG. 3 on an axis represented by the reference characters 26. The shock-absorbers may be pivoted on an axis represented by the pins 42, 42. Detachable plates 44, 44 may be adjustably mounted lengthwise of the respective brackets in order to stop the action of the bail at different positions as may be found necessary or convenient in the operation of the device.

Mounted on the headboard 18 of the truck there are a pair of plates 46, 46. These plates journal roller ends or shaft ends 48, one in each plate 46. Each one of these roller ends 48 is provided with a slot to lock to the crank 50. With the crank locked to the shaft, the latter may be rotated. One plate 46 also includes a non-circular socket 52 adapted to fit a member 54 on the crank 50 to lock the shaft 48 in the desired position merely by pushing inwardly on the crank so that the member 54 enters in the socket 52. By this arrangement the crank can be made to turn shaft 48 and to lock it in position.

On the shaft 48 there is provided a length of covering material such as tarpaulin, canvas, plastic film or the like, this being generally indicated at 53 and being connected by any desired means to the cross member 38 of the bail construction. It will be seen that when the springs 24 cause the bail to move in a clockwise direction from the inoperative position of FIGS. 1 and 2 to the operative position of FIG. 3, the cover material will be carried therewith and covers the contents of the truck body. The action of the springs 24 however can be prevented by reason of the projection 54 on the crank 50 in the socket 52 so that when the truck is empty the roll of covering material on the shaft 48 is held in the rolled-up position. It has been placed in this position, i.e., rolled up, by manually turning the crank 50 in the appropriate direction. Of course power means could be used for rolling up the covering material also if this should be found desirable or convenient.

Also conveniently mounted on the plates 46, 46 or in some other convenient location there is a sheet-like member 55 which extends the width of the body of the truck and this is pivoted as for instance on pins 56, 56 appropriately mounted as stated either in plates 46 or in some other way. At the ends of the sheet-like member 55 there are provided bent wires or tubes which extend outwardly as shown at 58 or alternatively at 60 in order to form hold-down feet. Of course there can be as many of these as may be desired but their purpose is to pivot over onto the cover material 53 when it is stretched out over the body of the vehicle and to hold this cover material down tightly just behind the headboard so that there is no gap between the cover and the contents of the truck body.

This hold-down member is held past dead center in the position shown in FIGS. 1 and 2 by means of springs 62 or the like and is manually turned over in a clockwise direction past dead center in the opposite direction so that the springs 62 also hold the hold-down member tightly onto the cover material in the covered position of the truck body.

Figure 3:
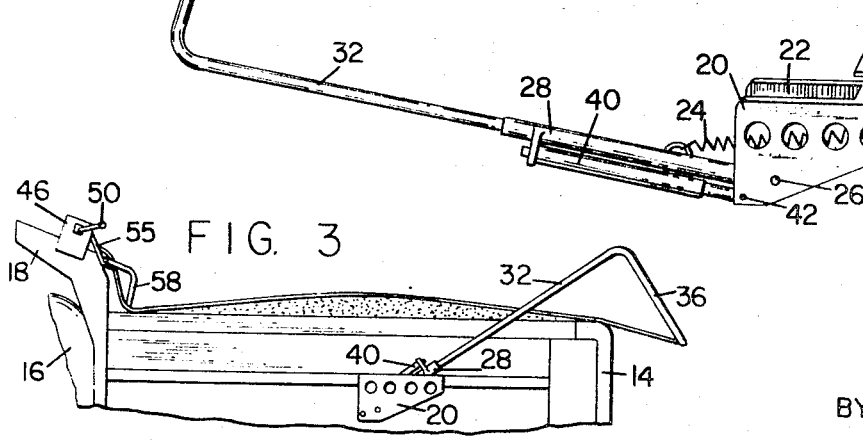
FIG. 3 shows the cover in operative condition.

With the device as shown in FIG. 1, the truck body may be filled. As soon as it is filled the operator merely pulls the crank 50 so that the projection 54 is removed from socket 52 whereupon springs 24 cause the bail to move from the position of FIG. 1 to the position of FIG. 3, drawing out the cover material 52 and completely covering the open truck body. Then the hold-down members 55, 58, 60 is moved over in a clockwise direction so that the feet 58 and 60 come down onto the cover between the legs 32 and 34 and hold the cover down in position as indicated in FIG. 3.

When it is desired to remove the cover, the operator moves the hold-down member 55 in a counterclockwise direction to a position where it is out of the way of the cover and the bail, and then inserts the projection 54 into the socket 52 and rolls the cover back up on shaft 48 causing the bail assembly to once more move back in a counterclockwise direction to the inoperative position shown in FIG. 1, whereupon he inserts the projection 54 in the socket 52, locking the parts in this position.

Having thus described my invention and the advantages thereof, I do not wish to be limited to the details herein disclosed, otherwise than as set forth in the claims, but what I claim is:

1. In combination with a vehicle body having a headboard and an open top, a cover roll assembly mounted on the headboard, said roll assembly comprising a shaft, a flexible vehicle body cover member releasably rolled up on said shaft and extending substantially across the width of the vehicle body headboard, a bail assembly comprising a pair of spaced generally parallel legs pivotally mounted one at each side of said vehicle body, a cross rod connection said legs completing the bail, said cross rod being located adjacent the roll assembly, means connecting said cross rod to one end of said flexible vehicle body cover member, means to swing said legs moving the cross rod from the vehicle headboard to the opposite end of the vehicle body and therefore unrolling said cover member from the shaft, so as to draw said cover member from one end to the other of the vehicle body, including hold-down means for the cover member adjacent the roll assembly, said last-named means comprising a pivoted member mounted in close association with respect to said roll assembly, and including extending feet adapted to impinge upon and hold down the material of said flexible vehicle body covering member.

2. In combination with a vehicle body having a headboard and an open top, a cover roll assembly mounted on the headboard, said roll assembly comprising a shaft, a flexible vehicle body cover member releasably rolled up on said shaft and extending substantially across the width of the vehicle body headboard, a bail assembly comprising a pair of spaced generally parallel legs pivotally said vehicle body, a cross rod connecting said legs completing the bail, said cross rod being located adjacent the roll assembly, means connecting said cross rod to one end of said flexible vehicle body cover member, means to swing said legs moving the cross rod from the vehicle headboard to the opposite end of the vehicle body and therefore unrolling said cover member from the shaft, so as to draw said cover member from one end to the other of the vehicle body, including hold-down means for the cover member adjacent the roll assembly, said last-named means comprising a pivoted member mounted in close association with respect to said roll assembly, and including extending feet adapted to impinge upon and hold down the material of said flexible vehicle body covering member, said hold-down means having an inoperative position out of the path of said cross rod of said bail and an operative position located within portions of the open vehicle body.

3. In combination with a vehicle body having a headboard and an open top, a cover roll assembly mounted on the headboard, said roll assembly comprising a shaft, a flexible vehicle body cover member releasably rolled up on said shaft and extending substantially across the width of the vehicle body headboard, a bail assembly comprising a pair of spaced generally parallel legs pivotally mounted one at each side of said vehicle body, a cross rod connecting said legs completing the bail, said cross rod being located adjacent the roll assembly, means connecting said cross rod to one end of said flexible vehicle body cover member, means to swing said legs moving the cross rod from the vehicle headboard to the opposite end of the vehicle body and therefore unrolling said cover member from the shaft, so as to draw said cover member from one end to the other of the vehicle body, including hold-down means for the cover member adjacent the roll assembly, said last-named means comprising a pivoted member mounted in close association with respect to said roll assembly, and including extending feet adapted to impinge upon and hold down the material of said flexible vehicle body covering member, said hold-down means having an inoperative position out of the path of the cross rod of said bail and an operative position located within portions of the open vehicle body, and means to hold the hold-down means in either of said positions selectively.

References Cited

UNITED STATES PATENTS

| | | | |
|---|---|---|---|
| 1,169,927 | 2/1916 | Collier | 296—98 |
| 1,289,944 | 12/1918 | Snyder | 160—68X |
| 1,378,510 | 5/1921 | Ackerland | 160—68X |
| 1,441,495 | 1/1923 | Galvin | 160—68 |
| 2,276,550 | 3/1942 | Skyum | 160—68X |
| 3,168,345 | 2/1965 | Roberts et al. | 296—100 |

FOREIGN PATENTS

| | | | |
|---|---|---|---|
| 522,834 | 4/1921 | France | 296—98 |
| 1,249,000 | 11/1960 | France | 160—68 |

BENJAMIN HERSH, Primary Examiner

R. R. SONG, Assistant Examiner